Figure 1:
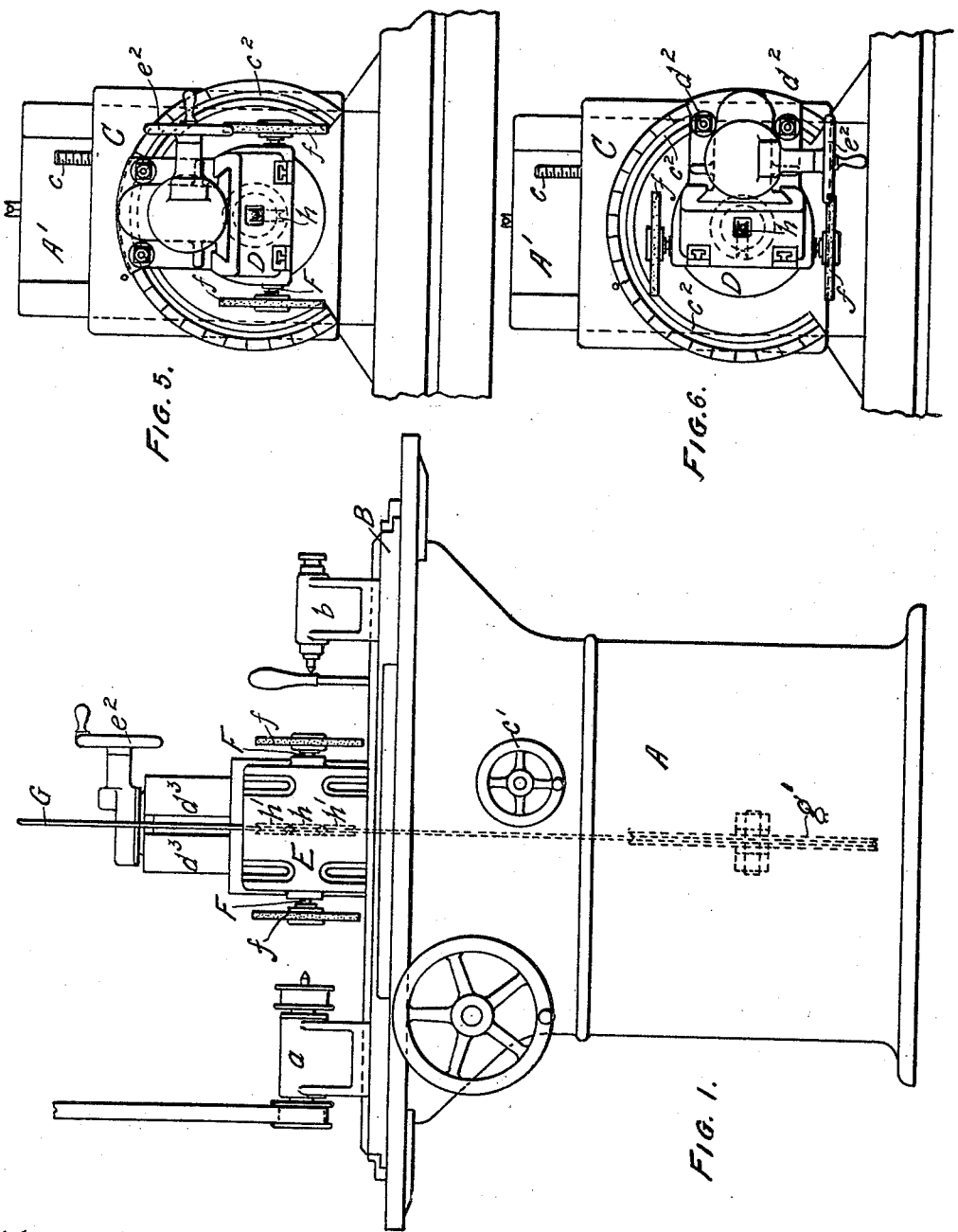

No. 696,034.   
C. R. GABRIEL.  
GRINDING MACHINE.  
(Application filed Jan. 28, 1901.)  
Patented Mar. 25, 1902.

(No Model.)   2 Sheets—Sheet 1.

WITNESSES,  
James H. Thurston  
Catherine G. Bradley

INVENTOR,  
Charles R. Gabriel  
By Wilmarth E. Thurston  
ATT'Y.

THE NORRIS PETERS CO., PHOTO-LITHO., WASHINGTON, D. C.

No. 696,034. Patented Mar. 25, 1902.
C. R. GABRIEL.
GRINDING MACHINE.
(Application filed Jan. 28, 1901.)
(No Model.) 2 Sheets—Sheet 2.
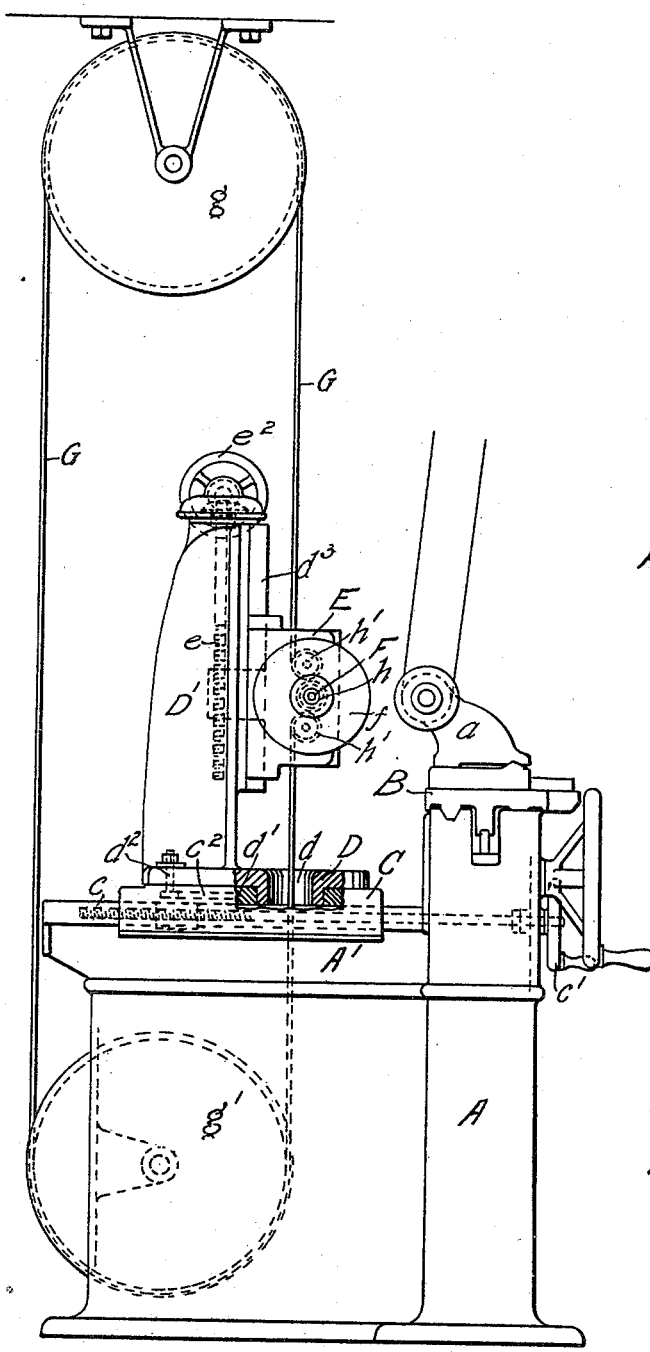
FIG. 2.
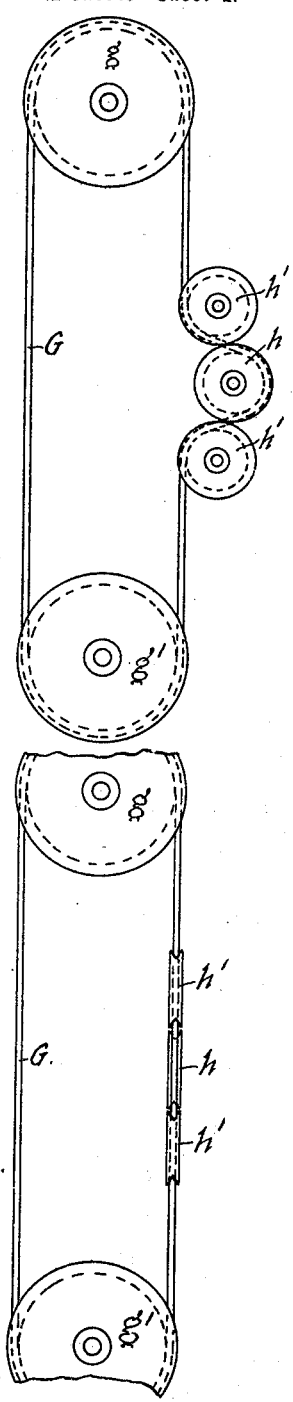
FIG. 3.
FIG. 4.
WITNESSES, INVENTOR,
James H. Thurston Charles R. Gabriel
Catherine G. Bradley BY Wilmarth H. Thurston
ATT'Y.

UNITED STATES PATENT OFFICE.

CHARLES R. GABRIEL, OF PROVIDENCE, RHODE ISLAND, ASSIGNOR TO THE BROWN AND SHARPE MANUFACTURING COMPANY, OF PROVIDENCE, RHODE ISLAND, A CORPORATION OF RHODE ISLAND.

GRINDING-MACHINE.

SPECIFICATION forming part of Letters Patent No. 696,034, dated March 25, 1902.

Application filed January 28, 1901. Serial No. 44,993. (No model.)

*To all whom it may concern:*

Be it known that I, CHARLES R. GABRIEL, of the city and county of Providence, in the State of Rhode Island, have invented certain new and useful Improvements in Grinding-Machines; and I do hereby declare the following specification, taken in connection with the accompanying drawings, forming a part of the same, to be a full, clear, and exact description thereof.

The present invention relates to the manner of mounting the grinding-wheel spindle and to the means for operating the same.

Heretofore it has been customary in the construction of grinding-machines to give to the work support or table the several adjustments—horizontal, vertical, and angular—requisite to adapt the machine to grind various forms of articles—as, for instance, the various forms of rotary cutters—and to enable the work to be presented to the grinding-wheel in the various positions made necessary by the varying forms of the articles to be ground. It is proposed in the present invention to give the requisite adjustments to the grinding-spindle instead of to the work-support; and to that end the invention consists in making the head which carries the grinding-spindle adjustable horizontally, vertically, and angularly and in providing means for effecting these several adjustments of the spindle-head; and it further consists in providing mechanism for driving the grinding-spindle which will permit these various adjustments and which will operate to properly drive said spindle in any of its adjusted positions.

Referring to the drawings, Figure 1 is a front elevation of a grinding-machine embodying the invention. Fig. 2 is an end elevation of the same. Fig. 3 is a diagrammatic view showing the arrangement of pulleys and driving-belt, the proportions of the parts being distorted for purposes of illustration. Fig. 4 is a view corresponding to Fig. 3, but showing the position of the pulley on the grinding-spindle and the adjacent idle pulleys when the spindle is adjusted to an angle of ninety degrees. Fig. 5 is a plan view, on an enlarged scale, of the spindle-head; and Fig. 6 is a corresponding view showing the spindle-head adjusted at an angle of ninety degrees.

A represents the frame of the machine, upon which the work-carrying table B is arranged to slide in suitable ways for the purpose of feeding the work past the grinding-wheel. Upon the table B are adjustably mounted the head-stock $a$ and tail-stock $b$, between which the work-supporting arbor is held. Mounted to slide in ways formed on the rearward extension A' of the frame is a sliding bed C, the position of which is adjusted by means of the screw $c$, mounted in the frame, and which engages a nut on the slide and is provided with a hand-wheel $c'$. By this construction the sliding bed and the parts carried thereby may be adjusted horizontally.

Mounted on the sliding bed C is a swivel-bed D, arranged to swivel or turn on the sliding bed. As shown in the drawings, the swivel connection is formed by providing the swivel-bed D with a hollow boss or pivot-stud $d$, which fits into a hole $d'$, counterbored in the upper side of the sliding bed C to receive the same. The sliding bed is also provided with an annular T-slot $c^2$ to receive the heads of clamp-bolts $d^2$, carried by the swivel-bed. By this construction the swivel-bed may be turned or adjusted with relation to the sliding bed and firmly clamped in any adjusted position.

The spindle-supporting head E is mounted to slide on ways $d^3$, formed on a vertical standard D', carried by the swivel-bed D. The position of the head E is adjusted by means of an adjusting-screw $e$, mounted in the standard D', which engages a nut on the spindle-head and is provided with a hand-wheel $e^2$. By this construction the spindle-supporting head may be adjusted vertically. The grinding-spindle F is mounted in suitable bearings in the supporting-head E and may be provided with a grinding-wheel $f$ at each end thereof, as shown in the drawings.

By the construction and arrangement of parts above described the wheel-spindle and grinding-wheel may be adjusted horizontally, vertically, and angularly with relation to the work, and by means of such adjustments the wheel may be presented to the work in varying positions and the machine thereby adapted for grinding articles of various forms. To enable the grinding-spindle to receive these various adjustments, it is necessary that the mechanism for driving or rotating said spindle shall be such as not to materially interfere with any of the desired adjustments and shall serve to properly drive the spindle in any of its adjusted positions. Such a driving mechanism is shown in the drawings. The driving-belt G passes around an overhead pulley $g$ and a pulley $g'$, mounted in the frame of the machine. Either one of these pulleys may be the driving-pulley, the other pulley being an idler. The belt G engages a pulley $h$, secured to the grinding-spindle, to revolve the same. The belt may be arranged to engage the pulley $h$ in any suitable way, so as to impart the necessary rotation thereto. Preferably the belt is made to engage a considerable portion of the periphery of the pulley $h$ by means of two idle pulleys $h'$ $h'$, mounted to revolve loosely in the spindle-supporting head, said idle pulleys being arranged one on each side of the grinding-spindle, as shown in the drawings. The leg of the belt which engages the pulley $h$ passes through the spindle-head and through the hollow boss $d$ and thence through the sliding bed, as shown in Fig. 2. By this construction and arrangement the leg of the belt stands substantially in the line of the axis about which the swivel-bed D turns, and thus substantially in the line of the axis about which the grinding-spindle is adjusted angularly. As a result the angular adjustment of the grinding-spindle does not change the position of said spindle or of the pulley thereon with relation to the line of the standing belt, and consequently the belt does not prevent or in any way interfere with such angular adjustment, the grinding-spindle being thereby free to be adjusted to any desired angle—as, for instance, to an angle of ninety degrees with its normal position, as shown in Figs. 4 and 6, Fig. 4 illustrating how such angular adjustment of the spindle may be made without disturbing the line of the standing belt. The vertical adjustment of the grinding-spindle may be likewise effected without any interference from the driving mechanism, the pulley on the grinding-spindle and the idlers $h'$ $h'$ simply riding along the standing leg of the belt as the spindle-supporting head is adjusted up or down. A horizontal adjustment of the grinding-spindle sufficient for practical purposes is permitted by the give or yield of the standing leg of the belt as the sliding bed C is adjusted in one direction or the other.

By the construction and arrangement above described means are provided for giving to the grinding-spindle the requisite horizontal, vertical, and angular adjustments, and these several adjustments may be effected without any interference from the driving mechanism, the driving mechanism being so constructed and arranged as not to in any way interfere with any of said adjustments.

What I claim as my invention, and desire to secure by Letters Patent, is—

1. In a grinding-machine a support for the grinding-spindle comprising a horizontally-movable member, a vertically-movable member, and a swivel member, the grinding-spindle being mounted for rotation in the vertically-movable member.

2. The combination of a horizontally-sliding bed, a swivel-bed mounted to turn on said sliding bed, a spindle-supporting head vertically adjustable on said swivel-bed, and a grinding-spindle mounted to rotate in said supporting-head.

3. The combination with a work-support of a grinding-spindle, a support for said grinding-spindle which is angularly adjustable with relation to said work-support, and a belt for rotating said grinding-spindle, one leg of said belt standing substantially in the axis about which said spindle-support turns in effecting said angular adjustment.

4. The combination with a work-support, of a grinding-spindle, a support for said grinding-spindle which is vertically and angularly adjustable with relation to said work-support, and a belt for rotating said grinding-spindle, one leg of said belt standing substantially in the axis about which said spindle-support turns in effecting said angular adjustment.

5. The combination with a work-support, of a grinding-spindle, and a support therefor, said grinding-spindle support embodying a swivel-bed provided with a hole or opening at or near the axis about which said swivel-bed turns.

6. The combination with a work-support, of a grinding-spindle, a support for said grinding-spindle embodying a swivel-bed provided with a hole or opening at or near the axis of said swivel-bed, and a belt passing through said opening for rotating said grinding-spindle.

7. The combination of a horizontally-sliding bed, a swivel-bed mounted to turn on said sliding bed, and a spindle-supporting head vertically adjustable on said swivel-bed, said swivel-bed being provided with a hole or opening at or near its axis.

8. The combination of a horizontally-sliding bed, a swivel-bed mounted to turn on said sliding bed, a spindle-supporting head vertically adjustable on said swivel-bed, and a grinding-spindle mounted to rotate in said supporting-head, said swivel-bed being provided with a hole or opening at or near its axis for the passage of a belt for rotating said grinding-spindle.

9. The combination with a work-support, of a grinding-spindle, a support therefor embodying a vertically-adjustable member, a belt for rotating said grinding-spindle, one leg of said belt standing substantially parallel to the line of movement of said vertically-adjustable member and engaging said grinding-spindle, to rotate the same, said grinding-spindle being adjustable vertically along the line of the standing belt.

10. The combination with a work-support, of a grinding-spindle, a support therefor embodying a swivel member and a vertically-adjustable member, said swivel member being provided with a hole or opening at or near its axis, a belt for rotating said grinding-spindle, one leg of said belt extending through said opening and standing substantially parallel with the line of movement of said vertically-adjustable member and engaging the grinding-spindle to rotate the same, said grinding-spindle being angularly adjustable about the line of the standing belt and being vertically adjustable along the line of said standing belt.

CHARLES R. GABRIEL.

Witnesses:
W. H. THURSTON,
J. H. THURSTON.